(12) United States Patent
Inoue

(10) Patent No.: US 6,960,911 B2
(45) Date of Patent: Nov. 1, 2005

(54) STRAIN SENSOR

(75) Inventor: Tetsuo Inoue, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 117 days.

(21) Appl. No.: 10/352,894

(22) Filed: Jan. 29, 2003

(65) Prior Publication Data

US 2003/0141867 A1 Jul. 31, 2003

(30) Foreign Application Priority Data

Jan. 29, 2002 (JP) ......................................... 2002-020448

(51) Int. Cl.$^7$ ............................. G01R 33/18; G01B 7/14
(52) U.S. Cl. ............. 324/209; 324/207.15; 324/207.11; 73/779; 73/774
(58) Field of Search ............................. 324/209, 207.11, 324/207.12, 207.18, 15, 249; 338/2, 5; 73/779, 160, 774, 146.5, 760, 862, 338, 862.471, 862.473, 862.474, 46.5; 336/40, 73, 77, 30, 232; 360/111; 174/18; 427/127; 428/694 PR

(56) References Cited

U.S. PATENT DOCUMENTS

| | | | | |
|---|---|---|---|---|
| 4,365,517 A | * | 12/1982 | Ramel et al. ................. | 73/722 |
| 5,141,158 A | * | 8/1992 | Allen ......................... | 239/252 |
| 5,189,591 A | * | 2/1993 | Bernot ....................... | 361/283.4 |
| 5,278,500 A | * | 1/1994 | Seitz .......................... | 324/249 |
| 5,355,714 A | * | 10/1994 | Suzuki et al. ............... | 73/146.5 |
| 5,400,489 A | * | 3/1995 | Hegner et al. .............. | 29/25.41 |
| 5,617,275 A | * | 4/1997 | Ogura et al. ................ | 360/317 |
| 6,164,933 A | * | 12/2000 | Tani et al. ................. | 417/413.2 |
| 6,278,379 B1 | * | 8/2001 | Allen et al. ............ | 340/870.16 |
| 6,387,225 B1 | * | 5/2002 | Shimada et al. ....... | 204/192.18 |
| 6,587,310 B1 | * | 7/2003 | Bennin et al. ........... | 360/245.8 |
| 6,593,841 B1 | * | 7/2003 | Mizoguchi et al. ......... | 336/200 |

FOREIGN PATENT DOCUMENTS

| | | |
|---|---|---|
| JP | 2000-292294 | 10/2000 |
| JP | 2002-81902 | 3/2002 |

* cited by examiner

*Primary Examiner*—Edward Lefkowitz
*Assistant Examiner*—Kenneth Whittington
(74) *Attorney, Agent, or Firm*—Oblon, Spivak, McClelland, Maier & Neustadt, P.C.

(57) ABSTRACT

A strain sensor includes a sensor section having a magnetic material provided on one surface of a conductor, the magnetic material being formed integrally with the conductor and having a magnetic strain constant with an absolute value larger than $1 \times 10^{-7}$, a fixing mechanism which fixes at least a part of the sensor section, an inductor disposed in a surface side of the sensor section which is opposite the surface on which the magnetic material is provided, the inductor being disposed opposite and away from the sensor section, and a detection unit which detects the amount of deformation of the sensor section caused by stress applied thereto on the basis of a change in inductance of the inductor.

24 Claims, 11 Drawing Sheets

STRAIN SENSOR

CROSS-REFERENCE TO RELATED APPLICATIONS

This application is based upon and claims the benefit of priority from the prior Japanese Patent Application No. 2002-020448, filed Jan. 29, 2002, the entire contents of which are incorporated herein by reference.

BACKGROUND OF THE INVENTION

1. Field of the Invention

The present invention relates to a strain sensor using an inductor, and in particular, to a strain sensor that measures strain by detecting the amount of deformation of a conductor caused by stress.

2. Description of the Related Art

The inventor of the present application has proposed a "position sensor" (Jpn. Ptn. Appln. KOKAI Publication No. 2002-81902) in which a soft magnetic film is formed on a back surface of a conductor provided on an object to be sensed to enable sensitivity to be improved and enable a decrease in sensitivity to be suppressed even when the distance between the conductor and an inductor increases.

If the above-mentioned position sensor is applied to a strain sensor, the sensitivity of this strain sensor is not sufficient if it must detect very slight deformation of the conductor and soft magnetic film. Thus, it is impossible to ensure a high signal/noise (S/N) ratio sufficient for signal processing executed by a succeeding circuit.

As an example of a strain sensor, Jpn. Pat. Appln. KOKAI Publication No. 2000-292294 discloses a method of detecting a change in the internal pressure of a closed container having an upper bottom portion and a lower bottom portion, using a strain sensor formed on an upper bottom plate or a lower bottom plate constituting the upper bottom portion or the lower bottom portion, respectively. However, this strain sensor has at least one coil formed of a magnetic thin film having magnetic strain, the coil being provided in a central portion of a non-magnetic material plate via a dielectric layer. Thus, this conventional sensor is based on an operational principle different from that of the sensor according to the above proposal which has a conductive coil disposed away from an object being detected.

BRIEF SUMMARY OF THE INVENTION

According to an aspect of the present invention, there is provided a strain sensor comprising: a sensor section having a conductor and a magnetic material provided on one surface of the conductor, the magnetic material having a magnetic strain constant with an absolute value larger than $1 \times 10^{-7}$; a fixing mechanism which fixes at least a part of the sensor section; an inductor disposed to face another surface of the sensor section which is opposite the one surface on which the magnetic material is provided, the inductor being disposed away from the sensor section; and a detection unit which detects the amount of deformation of the sensor section on the basis of a change in inductance of the inductor.

DETAILED DESCRIPTION OF THE INVENTION

Embodiments of the present invention will be described below with reference to the drawings.
(First Embodiment)

Figure 1:
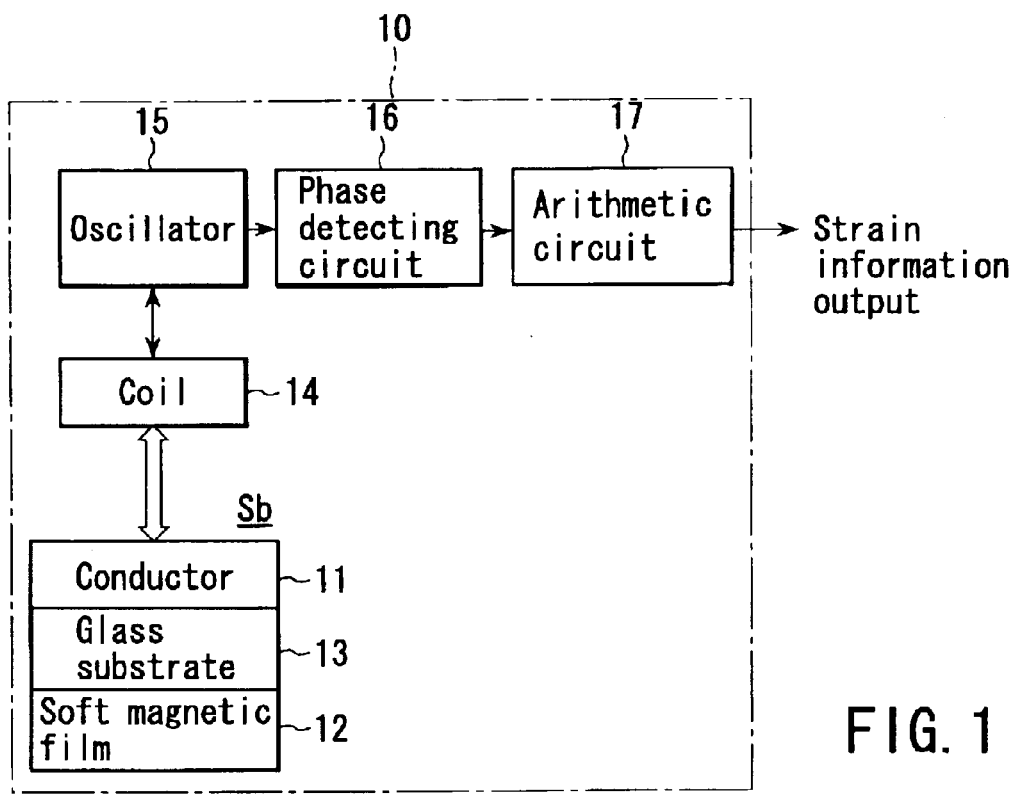
FIG. 1 is a block diagram showing the entire configuration of a strain sensor according to a first embodiment of the present invention.

FIG. 1 is a block diagram showing the entire configuration of a strain sensor according to a first embodiment of the present invention.

In FIG. 1, a strain sensor 10 is composed of a sensor section Sb having a conductor 11 and a soft magnetic film 12 stacked on front and back surfaces, respectively, of a glass substrate 13; a conductive coil 14 positioned apart from the sensor section Sb; an oscillator 15 for supplying an oscillation output to the conductive coil 14; a phase detecting circuit 16 detecting a phase of the oscillation output of the oscillator 15; and an arithmetic circuit 17 configured to obtain a strain information output on the basis of the phase detected by the phase detecting circuit 16.

Figure 2A:
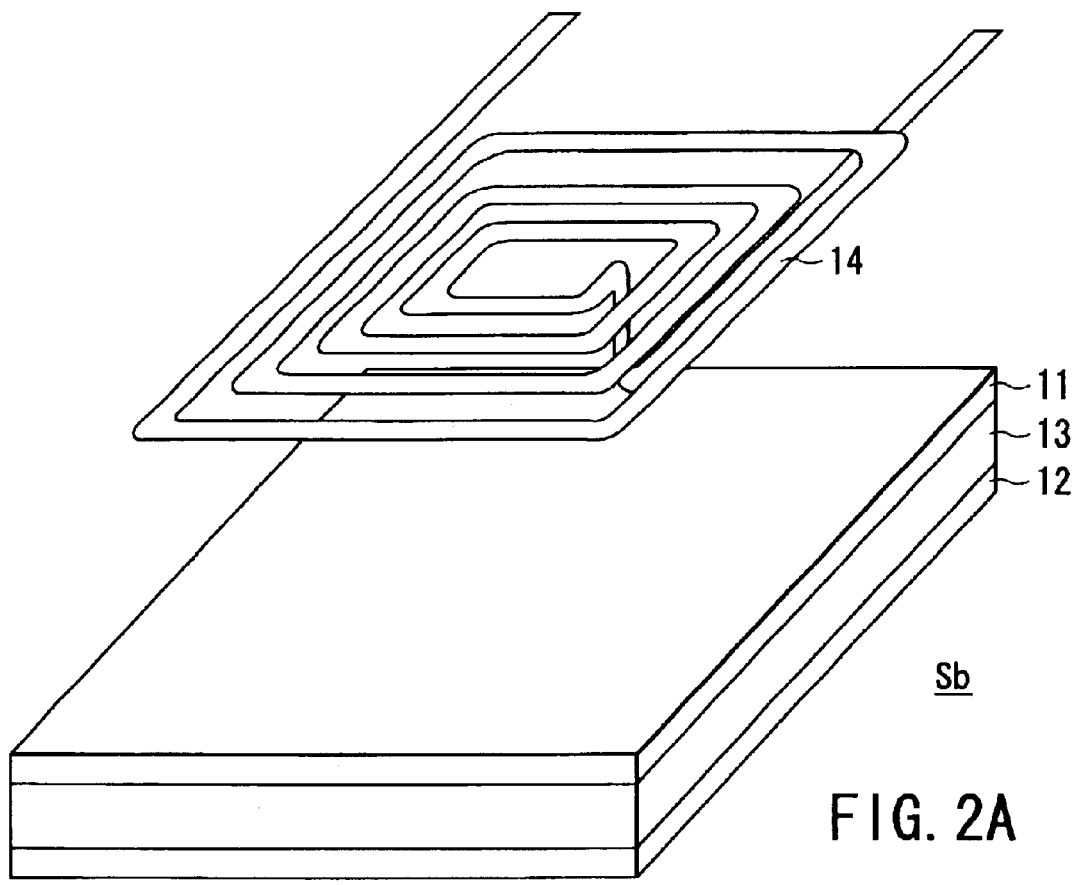
FIG. 2A is a perspective view showing a main part of the strain sensor shown in FIG. 1 and illustrating the operational principle of this strain sensor.
Figure 2B:
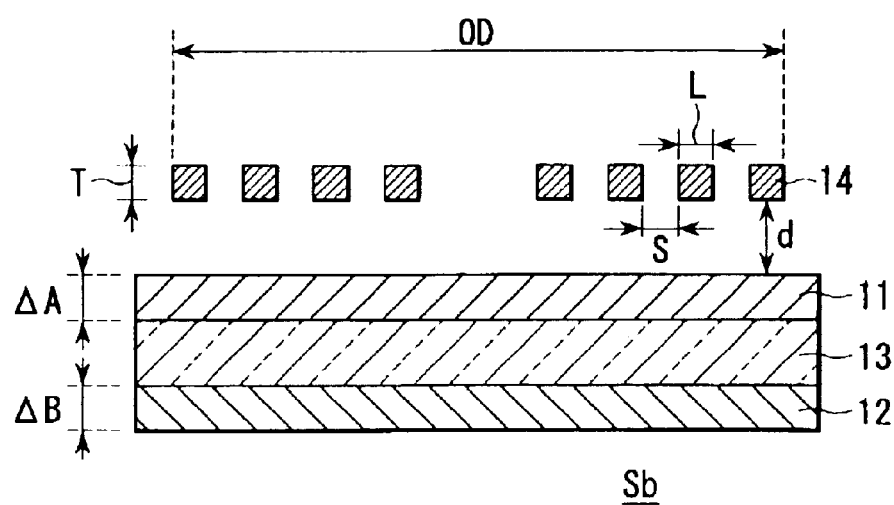
FIG. 2B is a sectional view of the strain sensor shown in FIG. 2A.

As shown in FIGS. 2A and 2B, the conductor 11 is provided on one surface of the glass substrate 13. The soft magnetic film 12 is provided on a surface of the glass plate 13 which is opposite to the surface on which the conductor 11 is provided. The sensor section Sb is formed by integrating the conductor 11, the glass substrate 13, and the soft magnetic film 12 together by, for example, bonding them together by an adhesive or applying or forming them by a vapor-phase epitaxy method. The sensor section Sb is fixed to an object to be sensed (not shown) at a plurality of points in, for example, its outer periphery (in this example, the sensor section Sb is fixed all along its outer periphery). This fixation causes a central portion of the sensor section Sb to be bent and deformed if the sensor section Sb is stressed.

The conductor 11 preferably has a low electric resistance ($1 \times 10^{-8}$ [Ω·cm] or less) and is preferably made of copper. In this example, the conductor 11 is formed by bonding a copper foil having a thickness ΔA of 0.15 [mm] to the upper surface of the glass substrate 13.

The soft magnetic film 12 has a relatively high magnetic permeability and has characteristics varied easily by external magnetic fields. The soft magnetic film 12 is preferably composed of a material having a magnetic permeability of 500 or more and maintaining flat frequency characteristics up to a frequency of about 50 MHz. Preferable materials include, for example, (a) permalloy and sendust, (b) iron-based amorphous metal, and (c) a film containing heteroamorphous or nanocrystal, a high-resistance soft magnetic film, as a material. Further, the soft magnetic film 12 formed of these materials has a negative magnetic strain constant λs (<0). The value of the magnetic strain constant λs is $|λs| \geq 5 \times 10^{-7}$ (in this embodiment, $|λs| \geq 10^{-6}$).

The soft magnetic film 12 is formed on the glass substrate 13 to a thickness ΔB of 2 [μm] by the vapor-phase epitaxy method.

On the other hand, the coil 14 is disposed on the opposite side to the glass plate 13 of the conductor 11, so as to lie opposite the conductor 11. Further, the coil 14 and the conductor 11 are disposed so as to have a space between themselves which corresponds to a distance d as shown in FIG. 2B. For simplification, the unitary coil 14 is shown. However, actually, the coil 14 is, for example, a spiral inductor having a copper plate arranged on a support substrate and selectively etched in spiral form, or an inductor having an aluminum pattern arranged on a semiconductor wafer in spiral form, or a simple wire coil. In this example, the coil 14 has an outer diameter (OD) of 4,000 [μm], a coil width (L) of 80 [μm], an inter-coil space (S) of 80 [μm], 10 turn windings, and a coil thickness (T) of 19 [μm].

In FIG. 1, the oscillator 15 supplies an oscillation signal of, for example, 10 MHz to the coil 14. The phase detecting circuit 16 detects the phase of the oscillation signal to output a phase information signal. Further, the arithmetic circuit 17 converts the phase information signal obtained by the phase detecting circuit 16, into strain information output representing the deformation of the conductor 11 to deliver the strain information output to the exterior as an output of the strain sensor 10.

The oscillator 15, the phase detecting circuit 16, and the arithmetic circuit 17 constitute a measuring instrument section of the strain sensor 10. This measuring instrument section has a function of electrically measuring the amount of deformation of the conductor 11 on the basis of a change in inductance of the coil 14.

Now, description will be given of operations of the strain sensor 10 configured as described above.

Figure 3A:
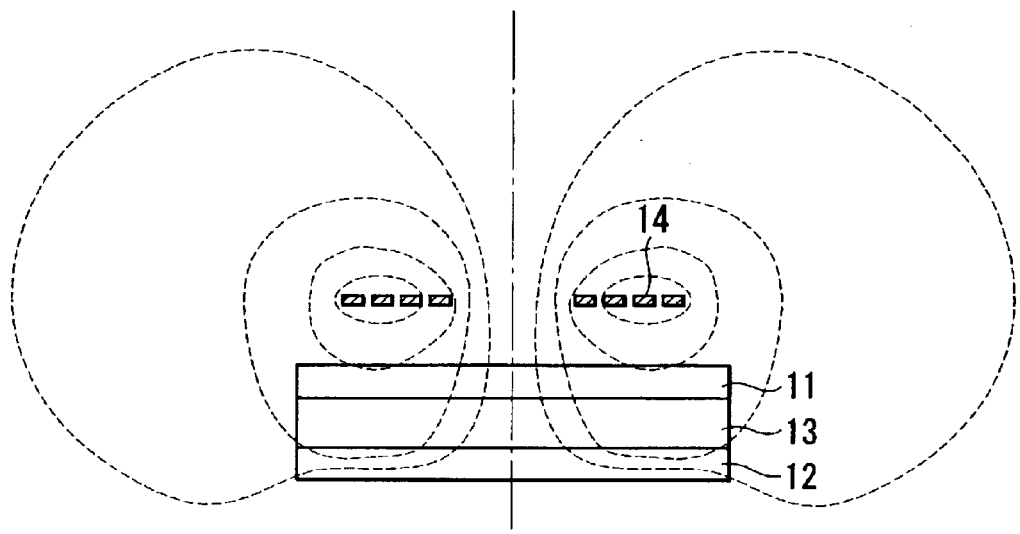
FIG. 3A is a diagram showing equi-vector-potential lines obtained if a soft magnetic film is provided in the strain sensor.
Figure 3B:
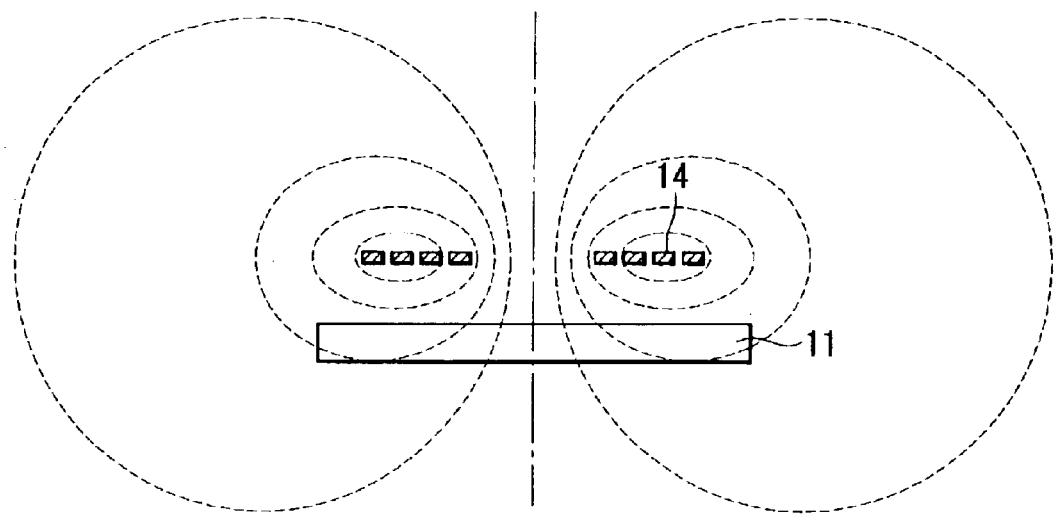
FIG. 3B is a diagram showing equi-vector-potential lines obtained if no soft magnetic film is provided.

When the oscillator 15 supplies an oscillation signal to the coil 14, the coil 14 generates a magnetic flux. FIG. 3A is a diagram showing equi-vector-potential lines of the magnetic flux obtained if the soft magnetic film 12 is provided. FIG. 3B is a diagram showing equi-vector-potential lines of the magnetic flux obtained if no soft magnetic film is provided.

If the soft magnetic film 12 is provided as shown in FIG. 3A, equi-vector-potential lines are closer to the conductor 11 than those obtained in the case in which no soft magnetic film is provided as shown in FIG. 3B. That is, the soft magnetic film 12 serves to decrease magnetic resistance. Accordingly, magnetic fluxes generated when current flows through the coil 14 link up with the conductor 11 more efficiently. Thus, a larger eddy current is generated in the conductor 11 than in the case in which the soft magnetic film 12 is not provided. As a result, the inductance of the coil 14 decreases larger under the effect of the conductor 11.

Figure 4A:
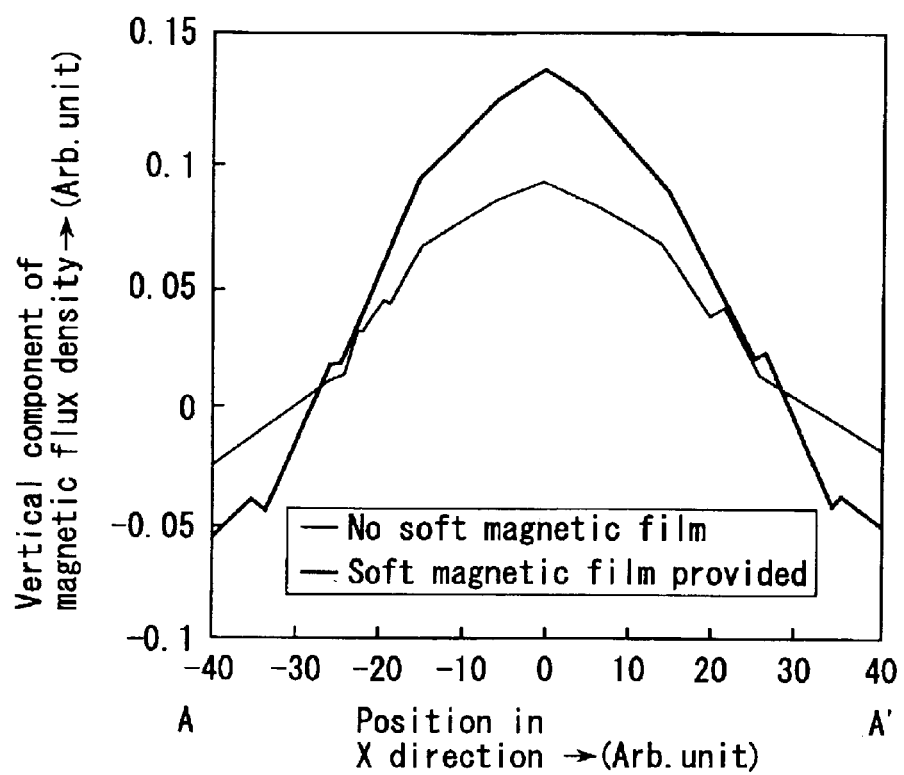
FIG. 4A is a graph illustrating a difference in magnetic flux density between the case in which a soft magnetic film is provided and the case in which no soft magnetic film is provided.
Figure 4B:
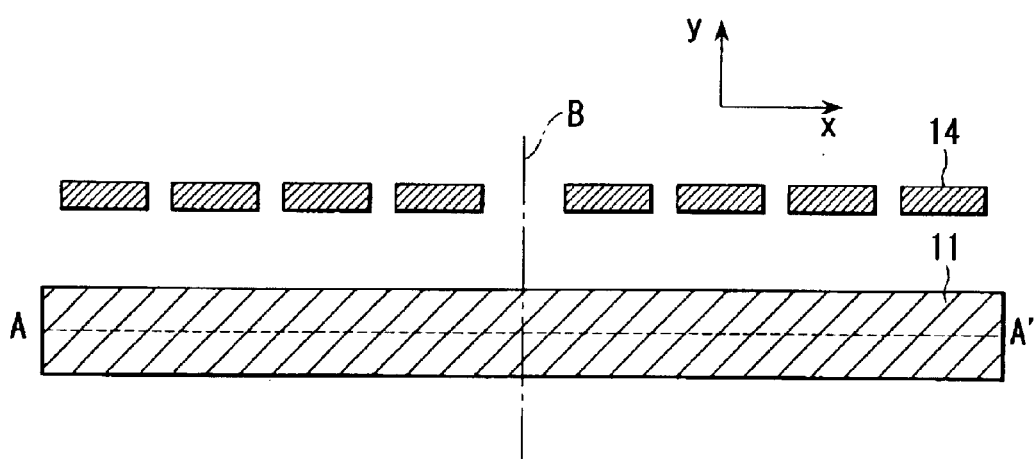
FIG. 4B is a diagram illustrating the position in the strain sensor at which the magnetic flux density shown in FIG. 4A is measured.

FIG. 4A is a graph illustrating magnetic flux density observed if the soft magnetic film 12 is provided and if it is not provided. FIG. 4B is a diagram showing the position on the conductor 11 at which the magnetic flux density shown in FIG. 4A is measured.

FIG. 4A shows a comparison of the magnetic flux density in the conductor 11 observed if the soft magnetic film 12 is provided with the magnetic flux density observed if it is not provided; this figure shows how a component of the magnetic flux density present in a normal B direction in FIG. 4B (y direction), i.e. a vertical component is distributed on line A–A' (x direction). The amount of change in inductance increases consistently with the value of square of a component linking up with the conductor 11 (crossing it in the normal B direction). Accordingly, this indicates the effects of presence of the soft magnetic film 12. FIG. 4A indicates that the presence of the soft magnetic film 12 increases the magnetic flux density, near the center of the conductor 11, of a component linking up with the conductor 11, compared to the absence of the soft magnetic film 12.

Figure 5:
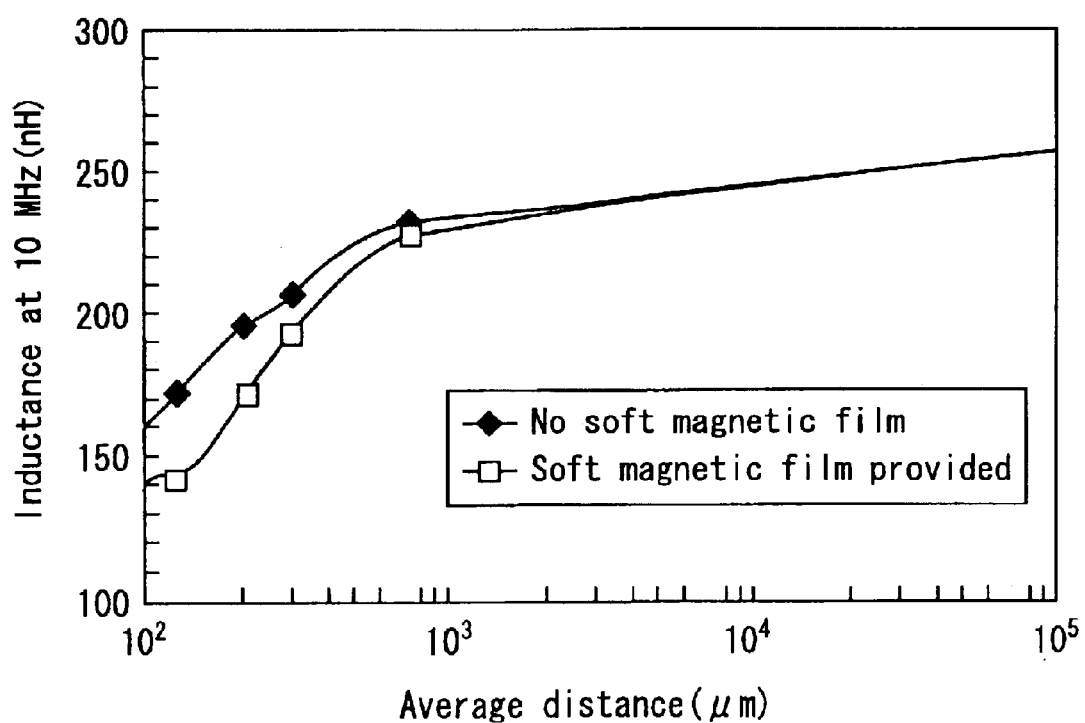
FIG. 5 is a graph showing the relationship between the inductance and the distance between a coil and a conductor in the case in which a soft magnetic film is provided and in the case in which no soft magnetic film is provided.

While an oscillation signal is being supplied to the coil 14, if the conductor 11 is deformed to change the average relative positions of the coil 14 and the conductor 11, i.e. the average distance between them, then the inductance of the coil 14 changes. FIG. 5 is a graph showing the relationship between the inductance and the average distance between the coil 14 and the conductor 11 in the case in which the soft magnetic film 12 is provided on the conductor 11 and in the case in which the soft magnetic film 12 is not provided. This figure shows the results of a comparison in the case in which, for example, the soft magnetic film 12 has a magnetic permeability of 630, with the oscillator 15 having an oscillation frequency of 10 MHz. The figure indicates that the presence of the soft magnetic film 12 causes the amount of change in inductance to increase consistently with the amount of change in the average distance between the coil 14 and the conductor 11.

A change in inductance of the coil 14 changes the phase (or frequency) of an oscillation signal supplied to the coil 14. This change in the phase of the oscillation signal is detected by the phase detecting circuit 16. Then, the arithmetic circuit 17 converts the detected phase information into strain information on the conductor 11. Then, the strain information is output to the exterior.

Now, description will be given of an operation performed by the strain sensor 10 if the sensor section Sb is stressed.

Figure 6A:
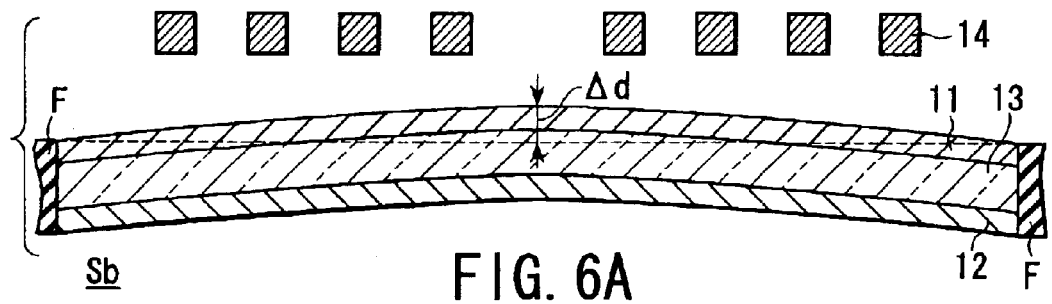
FIG. 6A is a sectional view showing how the sensor section shown in FIG. 1 is bent and deformed by stress in one direction.
Figure 6B:
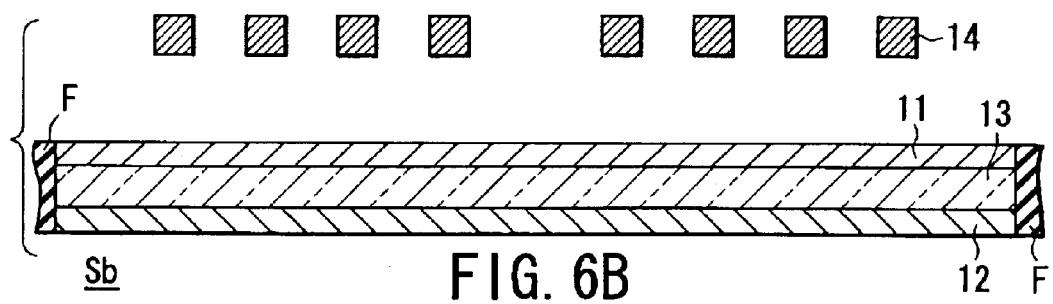
FIG. 6B is a sectional view showing that the sensor section shown in FIG. 1 is not bent or deformed.
Figure 6C:
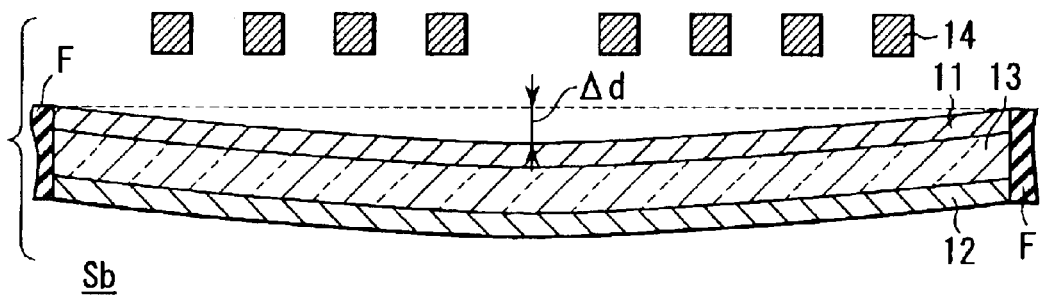
FIG. 6C is a sectional view showing how the sensor section shown in FIG. 1 is bent and deformed in another direction.

FIGS. 6A to 6C are sectional views showing how the sensor section Sb the periphery or the side edge portions of which are all fixed to a supporting member F is bent and deformed. FIG. 6A shows that a central portion of the sensor section Sb is bent and deformed toward the coil 14 (inward) by stress. FIG. 6B shows that the sensor section Sb is not stressed and that it is not bent and deformed. FIG. 6C shows that the central portion of the sensor section Sb is bent and deformed away from the coil 14 (outward) by stress. Further, in FIGS. 6A and 6C, $\Delta d$ denotes the amount of flexion of the conductor 11.

If the sensor section Sb is bent inward as shown in FIG. 6A, the average distance between the coil 14 and the sensor section Sb decreases. Accordingly, the inductance of the coil 14 decreases compared to the case in which the sensor section Sb is not bent. On the other hand, if the sensor section Sb is bent outward as shown in FIG. 6C, the average distance between the coil 14 and the sensor section Sb increases. Accordingly, the inductance of the coil 14 increases compared to the case in which the sensor section Sb is not bent.

In this case, since the soft magnetic film 12 is provided, the magnetic resistance decreases. Further, an amount of flux linkage of the conductor 11 increases, so that the sensitivity of the sensor is improved. Furthermore, the soft magnetic film 12 has a negative magnetic strain constant, so that when compared to the use of a magnetic film free from magnetic strain, the inductance undergoes a great change relative to the same amount of deformation of the sensor section Sb. This improves the sensitivity of the sensor 10.

That is, if the sensor section Sb is bent and deformed inward as shown in FIG. 6A, the soft magnetic film 12 is contractedly deformed because it is fixed all along its periphery. This increases the magnetic permeability in a direction along a surface of the soft magnetic film 12. Thus, the amount of flux linkage with the conductor 11 increases compared to the use of a magnetic film free from magnetic strain. This decreases the inductance of the coil 14.

In contrast, if the sensor section Sb is bent and deformed outward as shown in FIG. 6C, the soft magnetic film 12 is extendedly deformed. This decreases the magnetic permeability in a direction along a surface of the soft magnetic film 12. Thus, the amount of flux linkage of the conductor 11 decreases compared to the use of a magnetic film free from magnetic strain. This reduces a decrease in inductance of the coil 14. Consequently, the sensitivity of the sensor 10 is improved.

An anisotropic magnetic field (magnetic anisotropy) $\Delta Hk$ resulting from magnetic strain in the soft magnetic film 12 is expressed as follows:

$$\Delta Hk = 3 \cdot \lambda s \cdot E \cdot Ts/2 \cdot Is \cdot R \cdot (1+\gamma) \tag{1}$$

If E: Young's modulus of the film 12
  $=2.1 \times 10^{12}$ [dyn/cm$^2$]
Is: saturation magnetization of the film 12
  $=955$ [gauss]
$\gamma$: Poisson ratio of the film 12=0.29
Ts: thickness of the film 12=0.01 [cm]
R: radius of curvature of the bent portion=5.6 [cm]
$\lambda s$: magnetic strain constant=$-10^{-6}$, then $\Delta Hk \geq 5$ [Oe].
By assuming that the area of the conductor 11 is 0.3 [cm□] and that the maximum amount of flexion $\Delta dmax=20 \times 10^{-4}$ [cm], R is determined as follows:

$$R = \Delta dmax^2 + (Ts/2)^2/2 \cdot \Delta dmax \tag{2}$$

When it is assumed that Hk=15 [Oe] while the sensor section Sb is not bent, Hk$\geq$10 [Oe] and the magnetic permeability $\mu r \geq 100$ if the sensor section Sb is bent inward as shown in FIG. 6A.

On the other hand, if the sensor section Sb is bent outward as shown in FIG. 6C, Hk$\geq$20 [Oe] and the magnetic permeability $\mu r \geq 50$.

The above examples of numerical values indicate that if the sensor section Sb is bent outward as shown in FIG. 6C, the magnetic permeability decreases to half and the average distance between the coil 14 and the conductor 11 increases to about 40 [$\mu$m], compared to the case in which the sensor section Sb is bent inward as shown in FIG. 6A. Accordingly, the amount of flux linkage with the conductor 11 decreases effectively to increase the inductance compared to the case in which the sensor section Sb is not bent as shown in FIG. 6B. Further, since the soft magnetic film 12 has a negative magnetic strain constant, the amount of change in inductance increases. Consequently, when the sensor section Sb is bent, the amount of change in inductance $\Delta L$ increases by a factor of 1.5 from 40 [nH], observed if the magnetic permeability is constant (no magnetic strain occurs), to 65 [nH].

According to the first embodiment, the soft magnetic film 12 is provided on one surface of the glass substrate 13 and is composed of material having a negative magnetic strain constant. Consequently, a greater change in inductance of the coil 14 can be detected on the basis of a change in magnetic permeability caused by bending deformation of the soft magnetic film 12. This improves the sensitivity of the sensor 10.

Further, the sensor section Sb is bent and deformed to change the average distance between itself and the coil 14. Consequently, a change in inductance based on the change in average distance also serves to improve the sensitivity of the sensor 10.

[Second Embodiment]

Figure 7A:
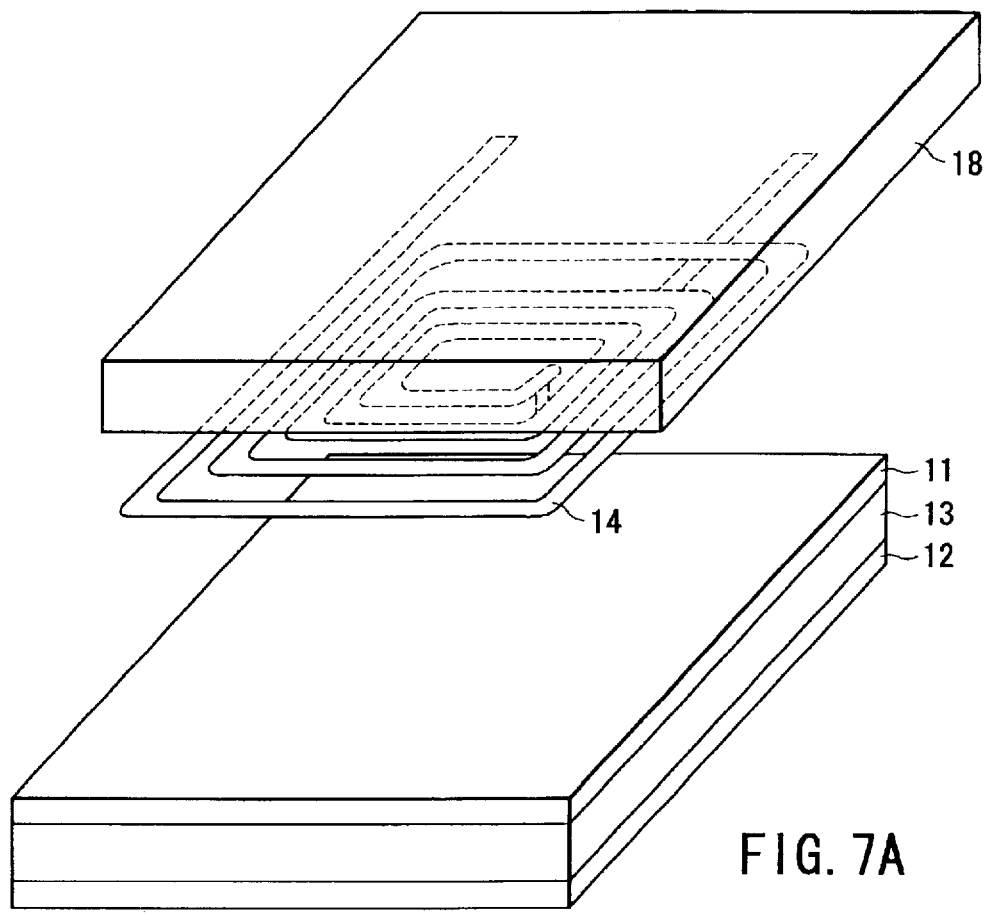
FIG. 7A is a perspective view showing a main part of a strain sensor according to a second embodiment of the present invention.
Figure 7B:
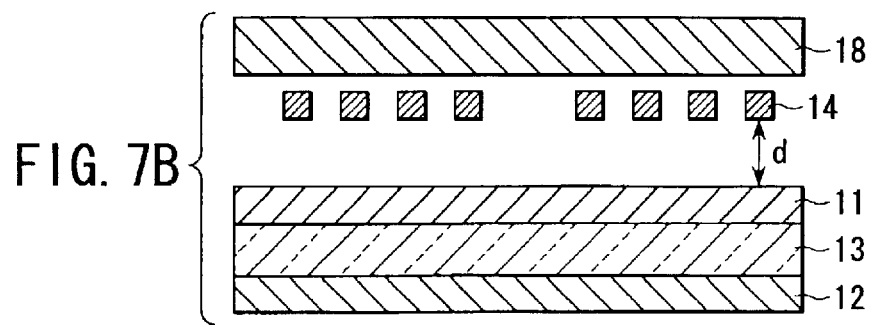
FIG. 7B is a sectional view of the strain sensor shown in FIG. 7A.

FIG. 7A is a perspective view showing a main part of a strain sensor according to a second embodiment of the present invention. FIG. 7B is a sectional view of the strain sensor shown in FIG. 7A.

The arrangement of the strain sensor section is the same as the one according to the first embodiment except that an additional soft magnetic material 18 is disposed on the opposite side to the conductor 11 of the coil 14, so as to lie on the rear side of the coil 14 via an insulator (not shown). Thus, the same arrangements as those in the strain sensor of the first embodiment of FIGS. 2A and 2B are denoted by the same reference numerals.

With this configuration, the soft magnetic material 18 serves to further decrease the magnetic resistance with respect to the flux generated from the coil 14. Thus, the magnetic flux generated when current flows through the coil 14 links up with the conductor 14 more effectively.

Thus, the conductor 11 generates a larger eddy current. The inductance of the coil 14 decreases larger under the effect of the conductor 11 (the amount of change increases). Therefore, the sensitivity of the sensor 10 can further be improved compared to the case in which the soft magnetic material 18 is not disposed.

(Third Embodiment)

According to a third embodiment, a strain sensor is constructed by fixing a central portion of a sensor section composed of a conductor and a soft magnetic film having a positive magnetic strain constant.

Figure 8A:
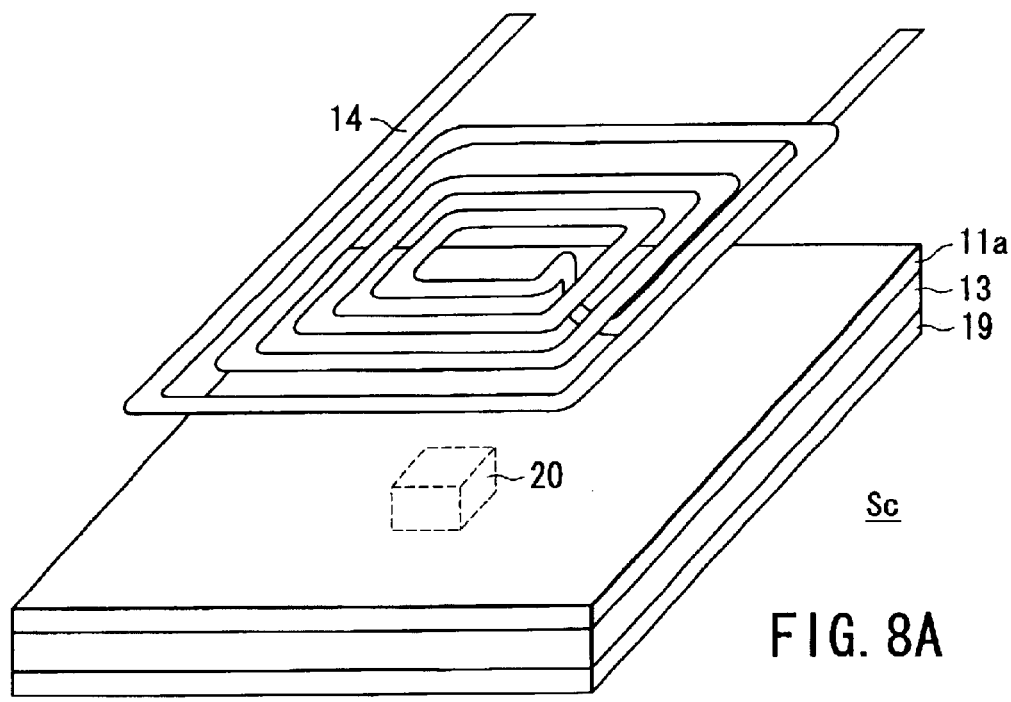
FIG. 8A is a perspective view showing a main part of a strain sensor according to a third embodiment of the present invention.
Figure 8B:
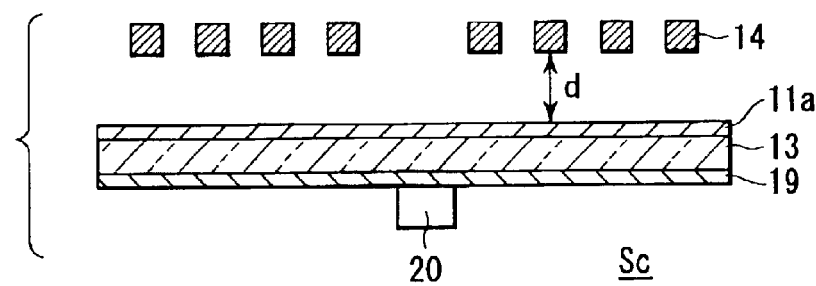
FIG. 8B is a sectional view of the strain sensor shown in FIG. 8A.

FIG. 8A is a perspective view showing a main part or a sensor section Sc of a strain sensor 10 according to the third embodiment of the present invention and illustrating its operational principle. FIG. 8B is a sectional view of the strain sensor section Sc shown in FIG. 8A. The same arrangements as those in the strain sensor of the first embodiment are denoted by the same reference numerals. Their description is thus omitted. Further, the arrangements of the first embodiment shown in FIG. 1 other than those of the sensor section Sc are the same. Thus, their description is also omitted.

In FIG. 8A, a soft magnetic film 19 having a positive magnetic strain constant is provided on one surface of the glass substrate 13. A conductor 11a is provided on a surface of the soft magnetic film 19 which is opposite the surface on which the glass substrate 13 is provided. The sensor section Sc thus configured is fixed by a fixing mechanism 20 at a central portion of the rear surface of the glass substrate 13.

The soft magnetic film 19 has a relatively high magnetic permeability and has characteristics varied easily by external magnetic fields. The soft magnetic film 19 preferably has a magnetic permeability of 500 or more and flat characteristics up to a frequency of about 50 MHz. For example, (a) permalloy and sendust, (b) iron-based amorphous metal, and (c) a film containing heteroamorphous or nanocrystal, a high-resistance soft magnetic film, are preferable as a material. Further, the soft magnetic film 19 is composed of a material having a positive magnetic strain constant $\lambda s$ (>0). The value of the magnetic strain constant $\lambda s$ is $|\lambda s| \geq 5 \times 10^{-7}$ (in this example, $|\lambda s| \geq 10^{-6}$). In the present third embodiment, the soft magnetic film 19 is formed by sputtering a soft magnetic material having a positive magnetic strain constant, on the glass substrate 13. At this time, sputtering in a predetermined magnetic field enables, for example, the easy axis of magnetization of the film 19 to point in a desired direction.

The conductor 11a is formed by coating with copper the glass substrate 13.

Figure 9A:
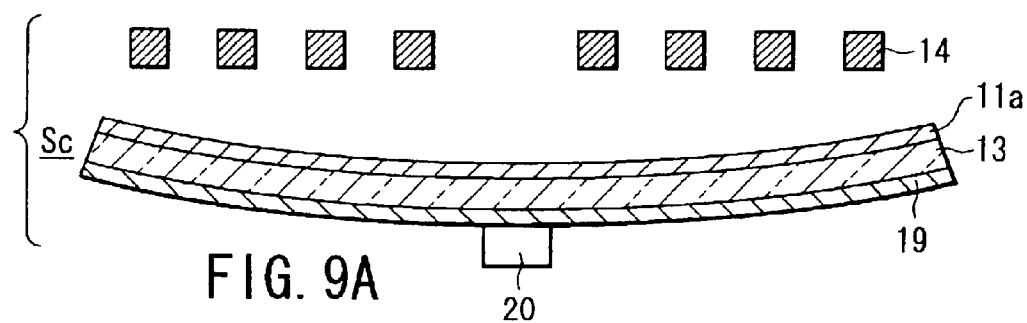
FIG. 9A is a sectional view showing how the sensor section shown in FIG. 8A is bent and deformed in one direction.
Figure 9B:
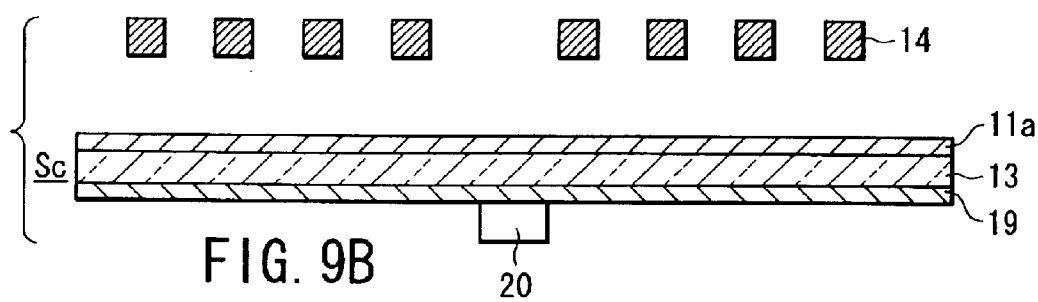
FIG. 9B is a sectional view showing a state in which the sensor section shown in FIG. 8A is not bent or deformed.
Figure 9C:
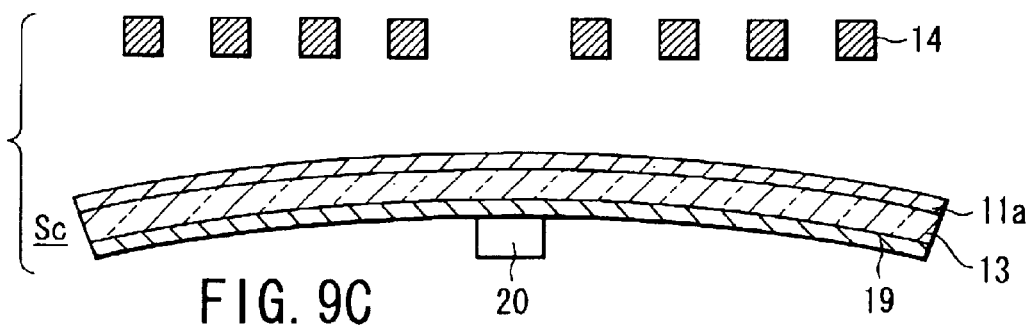
FIG. 9C is a sectional view showing how the sensor section shown in FIG. 8A is bent and deformed in another direction.

FIGS. 9A to 9C are sectional views showing how the sensor section Sc is bent and deformed. FIG. 9A shows that the sensor section Sc is bent and deformed toward the coil 14 (inward). FIG. 9B shows that the sensor section Sc is not bent. FIG. 9C shows that the sensor section Sc is bent and deformed away from the coil 14 (outward).

When the sensor section Sc undergoes stress from the glass substrate 13 in the inward direction, the periphery of the sensor section Sc is bent and deformed as shown in FIG. 9A because its center is fixed by the fixing mechanism 20. This decreases the average distance between the coil 14 and the sensor section Sc. Accordingly, the inductance of the coil 14 decreases compared to the case in which the sensor section Sc is not bent. In this case, the presence of the soft magnetic film 19 serves to decrease the magnetic resistance to increase the amount of flux linkage with the conductor 11a. Consequently, the sensitivity of the sensor is improved.

Furthermore, if the sensor section Sc is bent and deformed inward as shown in FIG. 9A, the soft magnetic film 19 is extendedly deformed. This increases the magnetic permeability in a direction along a surface of the film 19 because the soft magnetic film 19 has a positive magnetic strain constant. Accordingly, the amount of flux linkage with the conductor 11a increases compared to the use of a magnetic film free from magnetic strain. Consequently, the sensitivity of the sensor 10 is improved.

On the other hand, when the sensor section Sc undergoes stress from the conductor 11a in the outward direction, the peripheral portion of the sensor section Sc is bent and deformed as shown in FIG. 9C. This increases the average distance between the coil 14 and the sensor section Sc. Accordingly, the inductance of the coil 14 decreases compared to the case in which the sensor section Sc is not bent.

Furthermore, if the sensor section Sc is bent and deformed outward as shown in FIG. 9C, the soft magnetic film 19 is contractedly deformed. This decreases the magnetic permeability in a direction along a surface thereof because the soft magnetic film 19 has a positive magnetic strain constant. Accordingly, the amount of flux linkage with the conductor 11a decreases compared to the use of a magnetic film free from magnetic strain. Consequently, the amount of decrease in inductance of the coil 14 decreases to improve the sensitivity of the sensor 10.

The examples of numerical values described above in the first embodiment can also be applied to the present embodiment by changing the magnetic strain constant from negative value to positive value.

According to the third embodiment, described above, the soft magnetic film 19 is provided on one surface of the glass substrate 13 facing the coil 14 and is composed of a material having a positive magnetic strain constant. Consequently, a larger change in inductance of the coil 14 can be detected on the basis of a change in magnetic permeability caused by strain in the soft magnetic film 19. This improves the sensitivity of the sensor 10.

Further, the sensor section Sc is bent and deformed to change the average distance between itself and the coil 14. Consequently, a change in inductance based on the change in average distance also serves to improve the sensitivity of the sensor 10.

Furthermore, as with the second embodiment, the sensitivity can further be improved by constructing the strain sensor by disposing the soft magnetic material 18 on the opposite side to the conductor 11a of the coil 14, so as to lie opposite the coil 14 via an insulator (not shown).

And, if the fixing mechanism 20 of the present embodiment is applied to the sensor section Sb of the above first embodiment shown in FIGS. 2A and 2B, this also produces effects similar to those of the first embodiment, described above.

[Fourth Embodiment]

According to a fourth embodiment, a strain sensor is constructed by fixing one side of the periphery of a sensor section Sd composed of a conductor and a soft magnetic film having a positive magnetic strain constant.

Figure 10A:
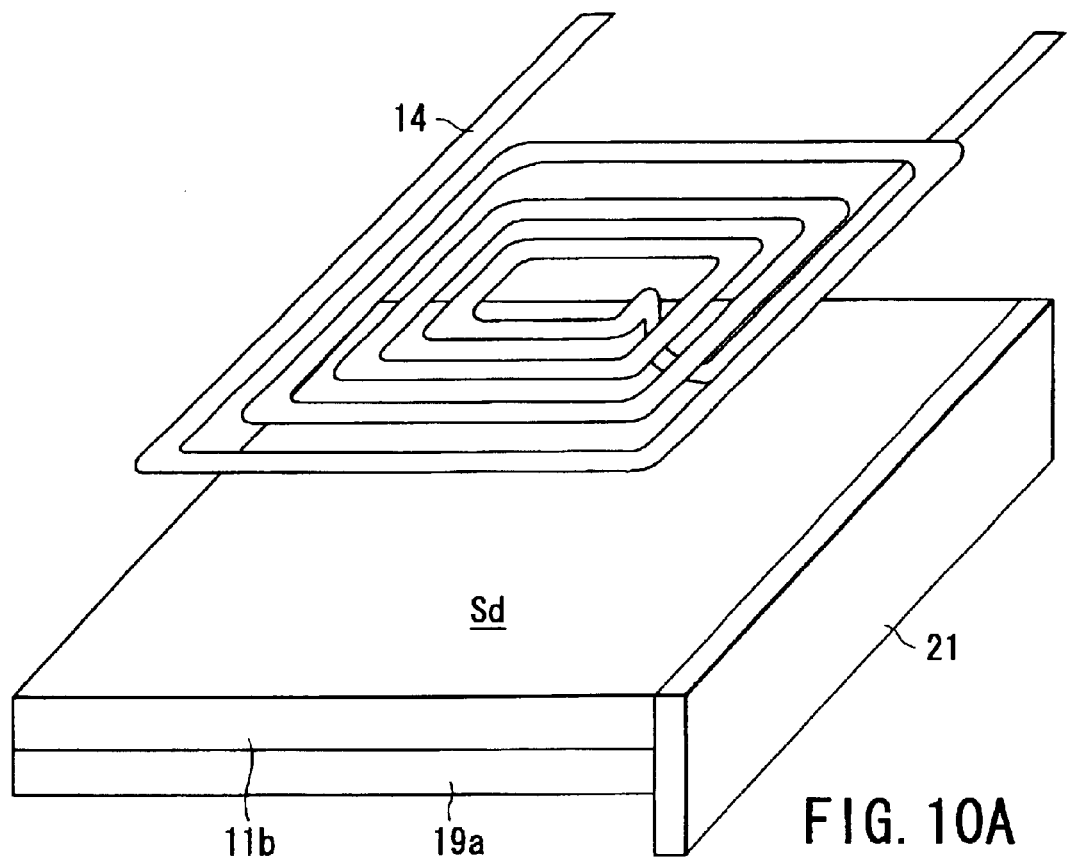
FIG. 10A is a perspective view showing a main part of a strain sensor according to a fourth embodiment of the present invention.
Figure 10B:
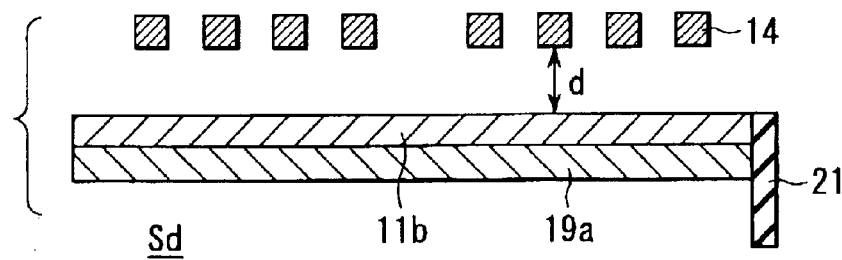
FIG. 10B is a sectional view of the strain sensor shown in FIG. 10A.

FIG. 10A is a perspective view showing a main part of a strain sensor according to a fourth embodiment of the present invention and illustrating its operational principle. FIG. 10B is a sectional view of the strain sensor section Sd shown in FIG. 10A. The same arrangements as those of the third embodiment are denoted by the same reference numerals. Their description is thus omitted.

In FIG. 10A, a conductor 11b is preferably composed of elastically deformative material. However, the present invention can be implemented even using plastically deformative material. If plastically deformative material is used, the conductor 11b can be made plastically deformative by coating the plastically deformative material on an elastically deformative substrate 19a or the like. Further, the conductor 11b preferably has a small electric resistance ($1 \times 10^{-8}$ [Ω·cm] or less) and is suitably a copper plate. In the present fourth embodiment, the conductor 11b is composed of, for example, a copper plate of thickness 0.15 [mm].

The soft magnetic film 19a is made of the same material having a positive strain constant as that in the third embodiment, described above. The soft magnetic film 19a, formed of a soft magnetic material, is bonded to the lower surface of the conductor 11b to constitute a sensor section Sd.

A fixing mechanism 21 fixes, for example, one side of the periphery of the sensor section Sd, composed of the conductor 11b and the soft magnetic film 19a, as shown in FIG. 10A. To fix the sensor section Sd, a part of the periphery may be fixed to the fixing mechanism 21.

Figure 11A:
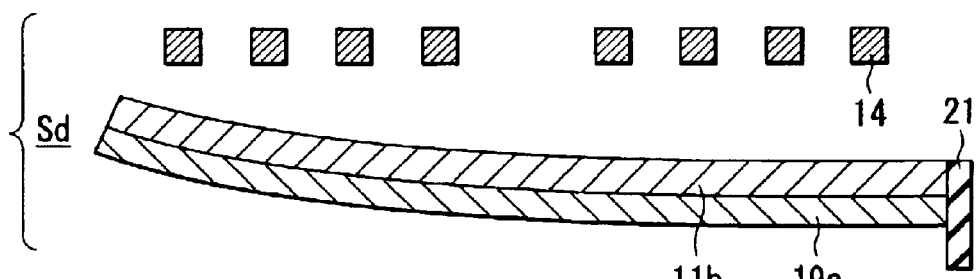
FIG. 11A is a sectional view showing how the sensor section shown in FIG. 10A is bent and deformed in one direction.
Figure 11B:
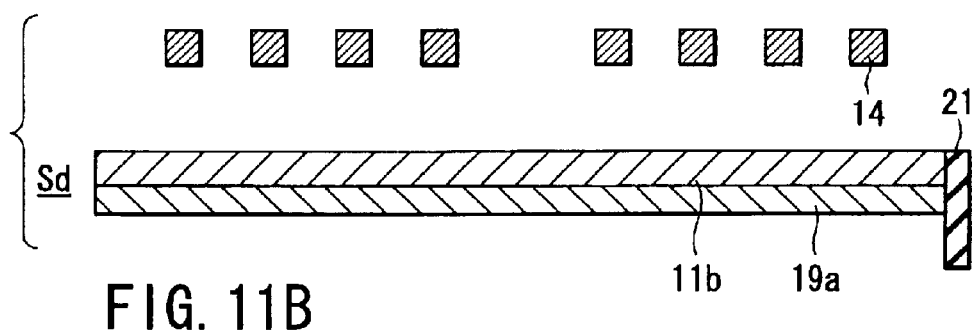
FIG. 11B is a sectional view showing a state in which the sensor section shown in FIG. 10A is not bent or deformed.
Figure 11C:
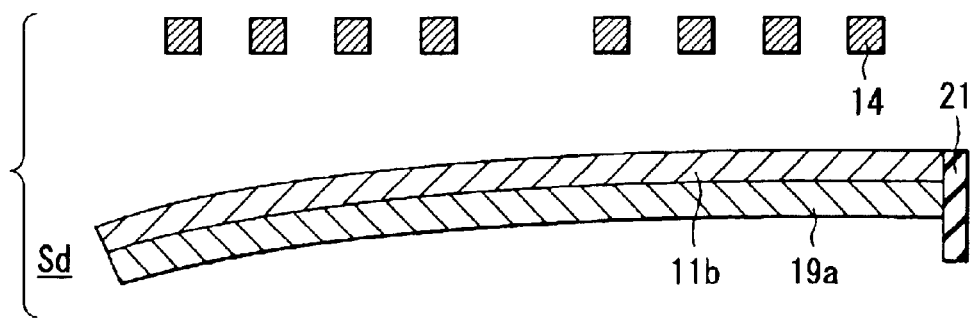
FIG. 11C is a sectional view showing how the sensor section shown in FIG. 10A is bent and deformed in another direction.

FIGS. 11A to 11C show how the sensor section Sd is bent and deformed when stress is applied thereto. FIG. 11A shows that the sensor section Sd is bent and deformed toward the coil 14 (inward). FIG. 11B shows that the sensor section Sd is not bent. FIG. 11C shows that the sensor section Sd is bent and deformed away from the coil 14 (outward).

This configuration also produces effects similar to those of the third embodiment, described above.

Further, as in the case with the second embodiment, the sensitivity of the strain sensor can further be improved by also disposing a soft magnetic material corresponding to that 18 shown in FIG. 7A on the opposite side to the conductor 11b of the coil 14, so as to lie opposite the coil 14 via an insulator (not shown).

Furthermore, the strain sensor Sd may be constructed by providing a glass substrate corresponding to that 13 shown in FIG. 8A, for example, on a rear surface of the soft magnetic film 19a which is opposite the surface on which the conductor 11b is provided. With this configuration, the present embodiment can also be implemented in the case in which the conductor 11b is not composed of elastically deformative material.

(Applied Examples of the Strain Sensor)

Figure 12A:
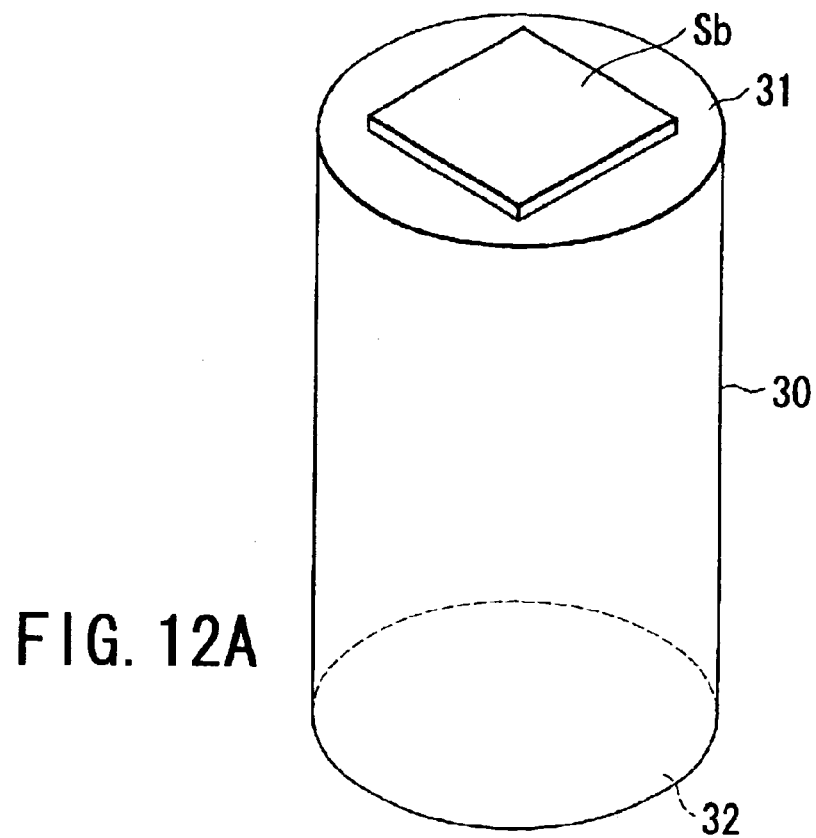
FIG. 12A is a perspective view showing an example in which the strain sensor shown in the first embodiment is applied.
Figure 12B:
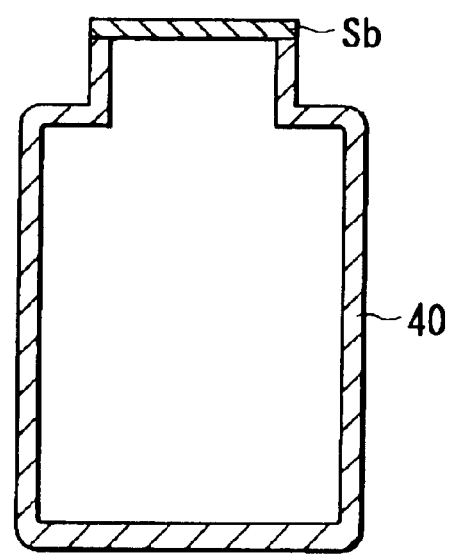
FIG. 12B is a perspective view showing another example in which the strain sensor shown in the first embodiment is applied.

FIGS. 12A and 12B are a perspective view and a sectional view showing applied examples of the strain sensor section Sb shown in the first embodiment.

As shown in FIG. 12A, the sensor section Sb, shown in the first embodiment, is stuck and fixed to a central portion of an upper bottom plate 31 of a cylindrical closed container 30. Thus, a pressure sensor is constructed which is based on a method of electrically detecting deformation of the upper bottom plate 31 caused by a change in the internal pressure of the closed container 30 on the basis of a change in inductance of a coil (not shown) fixed above the sensor section Sb. Alternatively, the sensor section Sb may be stuck and fixed to the bottom surface of the lower bottom plate 32.

In this case, the periphery of the upper bottom plate 31 or lower bottom plate 32 is fixed to the body of the container 30. Accordingly, a change in internal pressure causes the sensor section Sb to be bent and deformed together with the central portion of the upper bottom plate 31 or lower bottom plate 32.

If an increase in the internal pressure of the closed container 30 causes the sensor section Sb to be bent outside the container 30 and if a decrease in internal pressure causes the sensor section Sb to be bent inside the container 30, it is possible to ensure a high S/N ratio sufficient for signal processing executed by the succeeding circuit, enabling precise signal processing. This is because the strain sensor 10 shown in the first embodiment has a great unit change in inductance of the coil 14 relative to a unit change in internal pressure.

In this regard, the above applied example may be partly changed so that while an opening in the container 40 is closed by the sensor section Sb, the periphery of the sensor section Sb is held by the whole periphery of the opening, as shown in FIG. 12B. Even with this arrangement, the central portion of the sensor section Sb can be bent and deformed according to a change in internal pressure of the container 40. Therefore, a pressure sensor can be constructed as in the case with the above applied example.

The above applied examples have been described taking by way of example the use of the strain sensor section Sb according to the first embodiment. However, of course, the strain sensor section Sc according to the second embodiment may be used.

The fixing method of the sensor section Sb shown in the first embodiment can also be applied to the sensor section Sd shown in the fourth embodiment. The fixing method of the sensor section Sc shown in the third embodiment can also be applied to the sensor section Sb shown in the first embodiment and the sensor section Sd shown in the fourth embodiment. The fixing method of the sensor section Sd shown in the fourth embodiment can also be applied to the sensor section Sc shown in the third embodiment.

Further, the fixing methods of the sensor sections shown in the first to fourth embodiments are illustrative. Similar effects are can be obtained simply by fixing the sensor section so as to be deformed by stress. Accordingly, the sensitivity of the strain sensor can be improved by modifying the configuration of the fixing mechanism according to an object to be measured.

The sensor sections of the above embodiments have only to have the same positional relationship between the coil and the conductor and the soft magnetic film. The sensor section of each embodiment can also be implemented by replacing its forming method and configuration with those described in any of the other embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A strain sensor comprising:
    a sensor section having a conductor and a first magnetic material provided on one surface of the conductor, the magnetic material having a negative magnetic strain constant with a value of $-5 \times 10^{-7}$ or less;
    a fixing mechanism which holds the sensor section so as to allow a central portion of the sensor section to be deformed in response to stress, and fixes an entire periphery of the sensor section;
    an inductor disposed to face a surface of the sensor section which is opposite a surface on which the first magnetic material is provided, the inductor being disposed away from the sensor section; and
    a detection unit which detects an amount of deformation of the sensor section based on a change in inductance of the inductor,
    wherein magnetic permeability of the first magnetic material changes based on the amount of deformation, and increases when the first magnetic material contracts as a result of stress applied to the sensor section.

2. A strain sensor according to claim 1, further comprising a second magnetic material disposed on a surface of the inductor which is opposite the surface on which the sensor section is disposed, the second magnetic material being disposed opposite and away from the sensor section.

3. A strain sensor according to claim 1, wherein the first magnetic material comprises a soft magnetic material.

4. A strain sensor according to claim 1, wherein the detection unit includes an oscillator which supplies an oscillation signal to the inductor, a phase detecting circuit to detect phase information on this oscillation signal, and an arithmetic circuit which converts the phase information detected by the phase detecting circuit into an output denoting an amount of deformation of the sensor section.

5. A strain sensor according to claim 1, wherein the conductor comprises an elastically deformative material.

6. A strain sensor according to claim 1, wherein the conductor comprises a plastically deformative material.

7. A strain sensor according to claim 1, wherein the inductor has a spiral shape.

8. A strain sensor according to claim 1, wherein the sensor section includes a glass substrate having a first surface on which the conductor is provided and a second surface on which the first magnetic material is provided.

9. A strain sensor according to claim 1, wherein the conductor has an electric resistance of $1 \times 10^{-8} [\Omega \cdot cm]$ or less.

10. A strain sensor according to claim 1, wherein the magnetic permeability of the first magnetic material decreases when the first magnetic material expands as a result of said stress.

11. A strain sensor according to claim 1, wherein the first magnetic material increases magnetic flux crossing the conductor, the magnetic flux being increased when the first magnetic material contracts as a result of stress applied to the sensor section.

12. A strain sensor according to claim 1, wherein the first magnetic material decreases magnetic flux crossing the conductor, the magnetic flux being decreased when the first magnetic material expands as a result of stress applied to the sensor section.

13. A strain sensor according to claim 1, wherein the fixing mechanism fixes the sensor section such that the first magnetic material contracts.

14. A strain sensor according to claim 1, wherein the sensor section is fixed such that the magnetic material contracts in a plane direction when the distance between the sensor section and the inductor decreases and expands in the plane direction when the distance between the sensor section and the inductor increases.

15. A strain sensor comprising:
a sensor section having a conductor and a first magnetic material provided on one surface of the conductor, the magnetic material having a positive magnetic strain constant with a value of $5 \times 10^{-7}$ or more;
a fixing mechanism which fixes a part of a periphery of the sensor section;
an inductor disposed to face a surface of the sensor section which is opposite a surface on which the first magnetic material is provided, the inductor being disposed away from the sensor section; and
a detection unit which detects an amount of deformation of the sensor section based on a change in inductance of the inductor,
wherein magnetic permeability of the first magnetic material changes based on the amount of deformation, and increases when the first magnetic material expands as a result of stress applied to the sensor section.

16. A strain sensor according to claim 15, further comprising a second magnetic material disposed on a surface of the inductor which is opposite the surface on which the sensor section is disposed, the second magnetic material being disposed opposite and away from the sensor section.

17. A strain sensor according to claim 15, wherein the detection unit includes an oscillator which supplies an oscillation signal to the inductor, a phase detecting circuit to detect phase information on this oscillation signal, and an arithmetic circuit which converts the phase information detected by the phase detecting circuit into an output denoting an amount of deformation of the sensor section.

18. A strain sensor according to claim 15, wherein the magnetic permeability of the first magnetic material decreases when the first magnetic material contracts as a result of said stress.

19. A strain sensor according to claim 15, wherein the first magnetic material increases magnetic flux crossing the conductor, the magnetic flux being increased when the first magnetic material expands as a result of stress applied to the sensor section.

20. A strain sensor according to claim 15, wherein the first magnetic material decreases magnetic flux crossing the conductor, the magnetic flux being decreased when the first magnetic material contracts as a result of stress applied to the sensor section.

21. A strain sensor according to claim 15, wherein the fixing mechanism fixes the sensor section such that the first magnetic material expands.

22. A strain sensor according to claim 15, wherein the sensor section is fixed such that the magnetic material expands in a plane direction when the distance between the sensor section and the inductor decreases and contracts in the plane direction when the distance between the sensor section and the inductor increases.

23. A strain sensor comprising:
a sensor section having a conductor and a first magnetic material provided on one surface of the conductor, the magnetic material having a positive magnetic strain constant with a value of $5 \times 10^{-7}$ or more;
a fixing mechanism which has a member fixing the central portion of the sensor section;
an inductor disposed to face a surface of the sensor section which is opposite a surface on which the first magnetic material is provided, the inductor being disposed away from the sensor section; and
a detection unit which detects an amount of deformation of the sensor section based on a change in inductance of the inductor,
wherein magnetic permeability of the first magnetic material changes based on the amount of deformation, and increases when the first magnetic material expands as a result of stress applied to the sensor section.

24. A strain sensor according to claim 23, wherein the sensor section is fixed such that the magnetic material expands in a plane direction when the distance between the sensor section and the inductor decreases and contracts in the plane direction when the distance between the sensor section and the inductor increases.

* * * * *